United States Patent [19]

Hirt

[11] 4,325,589
[45] Apr. 20, 1982

[54] SUPPORT OF A MACHINE PART WHICH ROTATES ON A BOLT OR THE LIKE

[75] Inventor: Manfred Hirt, Cravinhos, Brazil

[73] Assignee: Carl Hurth Maschinen- und Zahnradfabrik GmbH & Co., Munich, Fed. Rep. of Germany

[21] Appl. No.: 158,745

[22] Filed: Jun. 12, 1980

Related U.S. Application Data

[63] Continuation-in-part of Ser. No. 88,792, Jun. 12, 1980, abandoned, which is a continuation of Ser. No. 870,413, Jan. 18, 1978, abandoned.

[30] Foreign Application Priority Data

Jan. 21, 1977 [DE] Fed. Rep. of Germany ....... 2702321

[51] Int. Cl.$^3$ ............................. F16C 3/02; F16C 3/14
[52] U.S. Cl. ..................................... 308/101; 308/240
[58] Field of Search ............... 308/101, 240, 115, 106, 308/93, 97, 103

[56] References Cited

U.S. PATENT DOCUMENTS 1,591,391 7/1926 Lundberg ........................... 184/6.12
3,625,580 12/1971 DeHart et al. ....................... 308/240
4,235,481 11/1980 Fukuoka et al. ..................... 308/240

Primary Examiner—Lenard A. Footland
Attorney, Agent, or Firm—Blanchard, Flynn, Thiel, Boutell & Tanis

[57] ABSTRACT

A multi-surface friction bearing construction for a machine part, for example a planet gear of a planetary gear system, which rotates on a stationary pin or the like, the rotating machine part having a loading direction which is stationary relative to the pin. Several bearing surfaces on the circumference of the stationary pin are formed by pitch circles each having a cylindrical surface. The rotating machine part has a circular cylindrical bore. The radii of the cylindrical surfaces each differ from the radius of the cylindrical bore of the rotating part and form points of intersection with the radii of adjacent cylindrical surfaces. The stationary pin also has axially extending grooves in the surface thereof. The rotating part at least in the carrying area of its circular cylindrical bore is of a material having good sliding characteristics and a higher heat expansion coefficient than that of the other portions of the rotating part.

11 Claims, 6 Drawing Figures

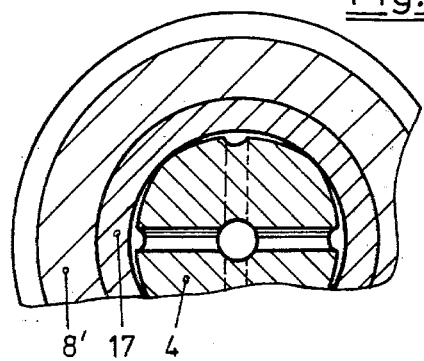
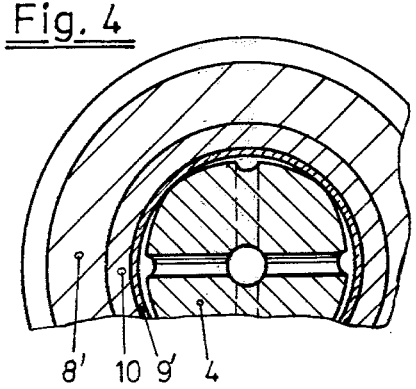
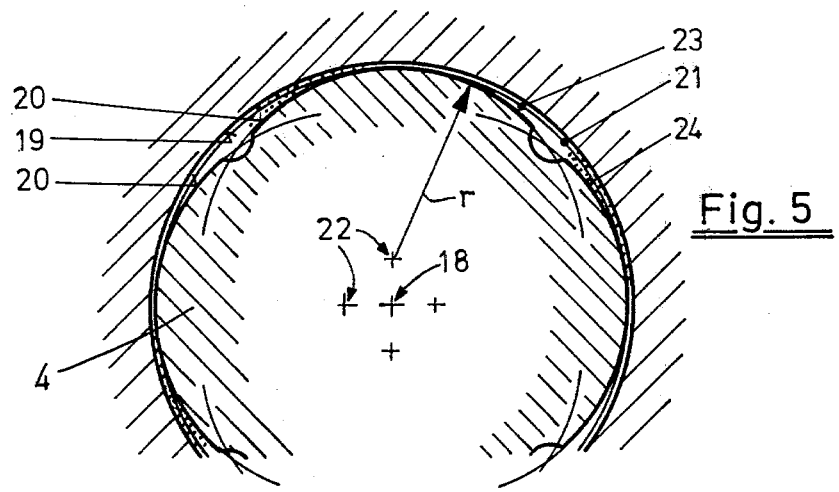
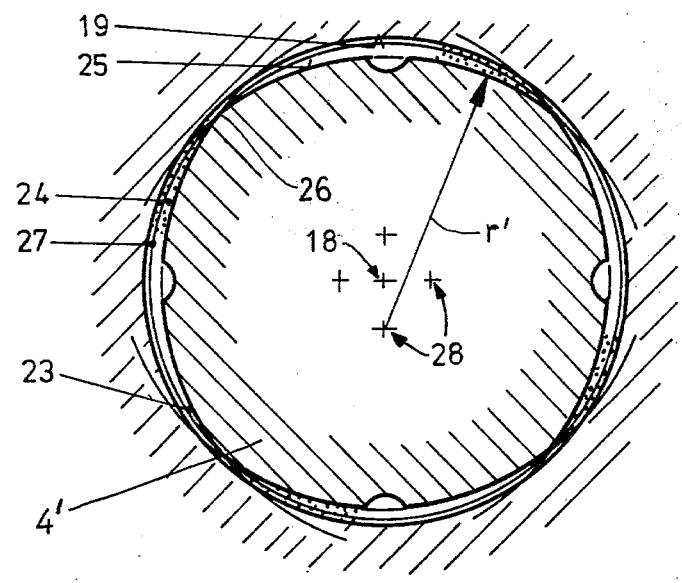

1

SUPPORT OF A MACHINE PART WHICH ROTATES ON A BOLT OR THE LIKE

CROSS REFERENCE TO RELATED APPLICATION

This application is a continuation-in-part of U.S. application Ser. No. 88 792, filed Oct. 29, 1979, now abandoned, in turn a continuation of U.S. application Ser. No. 870 413, filed Jan. 18, 1978, now abandoned.

FIELD OF THE INVENTION

The invention relates to a bearing construction for a rotatable machine part, and more particularly to a bearing construction for a planet gear carrier for a rotatable planet gear.

BACKGROUND OF THE INVENTION

In supporting machine parts, which rotate on a pin or the like which as a rule is stationary, as for example for planetary gears, friction (sleeve) bearings are often used. The cylindrical surfaces of the pin and rotating part lead, particularly at high rotational speeds, to an insufficient lubricating-film formation, since an oil cushion cannot form. Increasing the bearing clearance could help, but on the other hand would result in less true rotation. Especially in the case of toothed parts, less true rotation would in turn result in poor tooth engagement, consequent interfering noises, and finally damage to the tooth system.

For this reason, so-called multi-surface friction bearings are often used. Said bearings are distinguished by a noncircular bore shape. Instead of a closed circle, the bore consists of at least three, and usually more, separate pitch circles, which are distributed in the bore circumference. The radii of these pitch circles are larger by a certain amount than the inscribed circle which contacts all pitch circles. This form of construction assures for each friction surface which is formed by a pitch circle a narrowing lubricant gap and with it the formation of a lubricating wedge with pressure production simultaneously on all friction surfaces.

However, in the interest of a constant oil cushion for a rotating part, the position of the multi-surface profile should be constant with respect to the direction of the forces applied from outside, for example the forces applied by the toothed system.

Therefore, a basic purpose of this invention is to provide a bearing construction of the type described in the Oberbegriff, which has both the advantages of the multi-surface friction bearing and also minimizes the risk of seizure between the relatively rotating parts.

A simple reversal of the conventional multi-surface friction bearing, so as to apply the multi-surface profile to the stationary part (the pin or the like), will not be satisfactory. The usual construction, in which the part carrying the profile is made entirely or partially of a bearing metal, for example bronze, has the disadvantage that as the bearing heats up, the bearing clearance is reduced, due to the larger expansion coefficient of the bearing metal compared with steel. This causes further heating up of the bearing and, because of the thus-caused further bearing clearance reduction, the danger of bearing seizure exists. Furthermore, a bearing sleeve which is fixed on the pin or a coating of the bearing material on the pin would become loose as the bearing surfaces heat up.

Further advantages and characteristics of the invention can be taken from the following description.

BRIEF DESCRIPTION OF THE DRAWINGS

The invention is discussed in connection with exemplary embodiments illustrated in the following drawings. In the drawings:

FIGS. 5 and 6 show two embodiments of the multi-surface friction bearing profiles.

DETAILED DESCRIPTION

Figure 1:
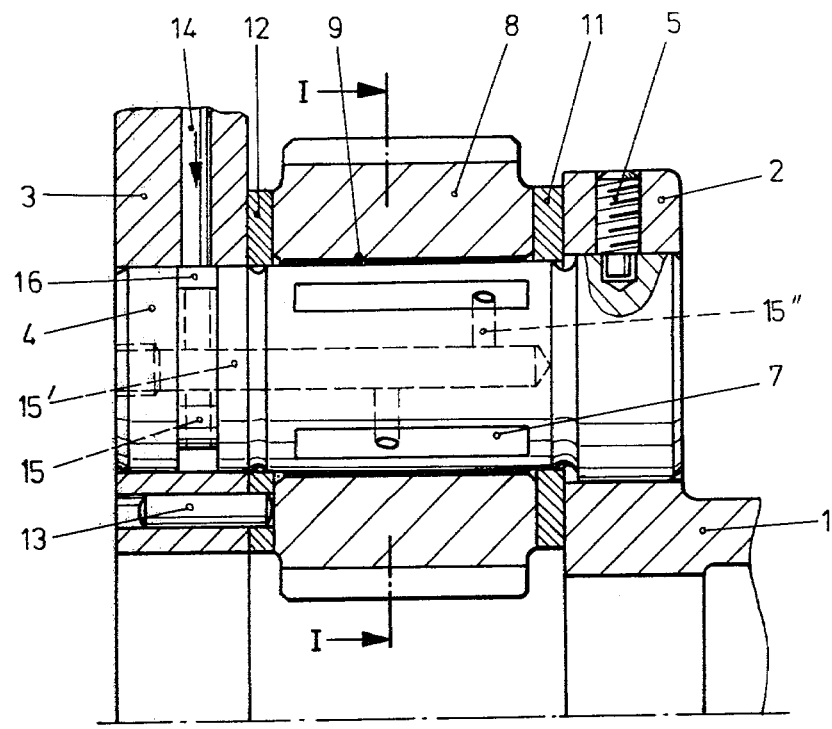
FIG. 1 is a longitudinal cross-sectional view of a bearing construction for a planet gear as an exemplary embodiment.

A planet-gear carrier 1 which is only partially illustrated in FIG. 1 receives in its radially extending flanges 2, 3 a planet gear support pin 4, which is locked against rotation and/or axial movement with respect to the flanges, for example by a threaded pin 5. The pin 4 has in its center part a profiling, which will be discussed hereinafter. The pin 4 is surrounded by the planet gear 8 on its profiled center part, the bore diameter of which planet gear is larger than is normally required for the amount of the needed bearing clearance than the outside diameter of the center part of the pin 4.

Figure 2:
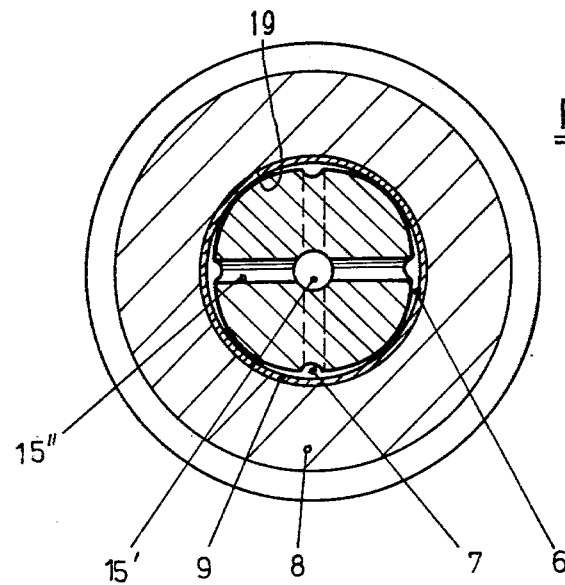
FIG. 2 is a cross-sectional view taken along the line I—I in FIG. 1, FIGS. 3 and 4 are cross-sectional views similar to FIG. 2, but showing respective modifications.

The planet gear 8 has in the area of its bore 19 a layer 9 (FIGS. 1 and 2) of a material with good sliding characteristics in order to reduce the sliding friction between it and the pin 4. This material can be applied, either by lining or spraying or the like, in a relatively thin layer directly to the wall of the bore. However, it is also possible, as illustrated in FIG. 3, to insert into the bore of the planet gear (here identified by reference numeral 8′) a sleeve 17 of a suitable material. Also possible is the insertion of a steel sleeve 10 (FIG. 4), the bore of which is coated with a suitable sliding material 9′. All in all, the latter construction offers manufacturing advantages. The coating of the bore of the rotating part is disadvantageous because of the danger of damage of previously precision-machined portions, for example the tooth surfaces, and the insertion of a sleeve 17 of bronze or the like is expensive because of high material cost. Steel sleeves 10, 9′ which are coated on the inside, however, can be obtained commercially in a finished condition or can be manufactured from suitable tubing. In every case, sliding material 9, 9′ having an expansion coefficient larger than that of steel is disposed in the bore 19 of the planet gear 8, 8′, so as to avoid influencing the bearing clearance by heat expansion of the sliding material: during heating up the bearing clearance is hardly changed, since particularly in the case of thin material layers 9, 9′ the diameter increase in the pin 4 corresponds with that of the bore of the planet gear.

Since for reasons of solidity as a rule both the planet gear pin 4 and also the planet gear 8, 8′ are manufactured of steel, either a bearing metal, for example bronze, or a plastic, for example polyamide, can be used for sliding material 9, 9′ or for the sleeve 17. These materials meet the requirements with respect to both the sliding characteristics and also with respect to the heat expansion.

Conventional buffer rings 11, 12 are arranged on both axially facing sides of the planet gear 8, 8′, which buffer rings are fixed in place by conventional means, for example pins 13 which are fixed in and to the planet-gear carrier. Lubricating oil can be fed in the direction of the arrow to the bearing, for example through a bore 14 in the flange 3 of the planet-gear carrier 1 and an annular groove 16 and bores 15, 15', 15" in the pin 4.

The sun gear and the toothed ring gear of the planetary gearing do not need to be discussed since they are without meaning for the invention. They are also not illustrated in the drawings.

An example of the above-mentioned profiling of the pin 4 is illustrated in FIG. 5. Differing from the otherwise common circular cylindrical form, the pin 4 in FIG. 5 is distinguished by a noncircular cross section. Instead of a closed circle, its surface consists of four separate pitch circles 20, which are uniformly large. If desired only three, or more than four, pitch circles 20 may be provided. It is important that the preferably equally large radii r of the several pitch circles 20 are smaller by a certain amount than the enveloping circle 21 which contacts all of the pitch circles. Thus, as many center points 22 exist as pitch circles exist. The center point of the bore 19 of the planet gear 8, 8' is identified by reference numeral 18. The diameter of the bore 19 is larger, by the amount of the bearing clearance, than the diameter of the enveloping circle 21. Wherever the bore center point 18 may lie within the given bearing clearance, for each individual sliding surface formed by the corresponding pitch circle 20, the distance between bore center point 18 and pitch circle center point 22 is always larger than the radial freedom of movement of the rotating part 8, 8' or half the bearing clearance. Thus each of the sliding surfaces is always guaranteed a narrowing lubricant gap 23 and with it the generation of a wedge 24 of lubricant with pressure produced simultaneously on each sliding surface 20, which generation is independent from outside influences. A groove 7 extends axially between each two sliding surfaces 20. The lubricating oil is fed through the mentioned bores 15, 15', 15". The lubricating oil reaches from said grooves into the lubricant gap 23. The grooves 7 are illustrated with a rounded groove base, but of course the grooves may also have any other desired cross-sectional shape. The layer 9 (or 9' or 17) extends coextensively with the grooves, or channels, 7, such that it extends axially at least the length of the grooves or channels 7 to overlie same.

It does not require much explanation to recognize that the pin cross-section shown in FIG. 5 can be manufactured only with difficulty. The pin cross-section shown in FIG. 6 is easier to manufacture. There the individual pitch circles 25 or sliding surfaces of the pin 4' have radii r', which are larger by a certain amount than the radius of a circle 27 which contacts the points of intersection 26 of the pitch circles. Here too, as many center points 28 are provided as there are pitch circles. The center point of the bore of the planet gear 8, 8' is again identified with reference numeral 18. The diameter of the bore 19 is larger by the amount of the bearing clearance than the diameter of the contacting circle 27. Wherever the bore center point 18 may lie within the given bearing clearance, for each individual sliding surface 25 the distance between each center 28 and the center 18 is always larger than the radial freedom of movement of the rotating part 8, 8' or half the bearing clearance. In this way also, each sliding surface is always guaranteed a narrowing lubricant gap 23 and thus the generation of a lubricating wedge 24. The pin embodiments of FIGS. 5 and 6 can of course be used with any of the sliding material arrangements of FIGS. 2-4.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A multi-surface friction bearing construction for a machine part, for example a planet gear, which rotates on a stationary pin or the like, the rotating machine part having a loading direction which is stationary relative to the pin, wherein the improvement comprises several bearing surfaces on the circumference of said stationary pin and formed by pitch circles each having a cylindrical surface, the rotating machine part having a circular cylindrical bore, the radius of each cylindrical surface differing from the radius of said cylindrical bore of said rotating part and forming points of intersection with the radii of the adjacent cylindrical surfaces, said stationary pin in addition having axially extending grooves arranged in the surface thereof, said rotating part at least in the carrying area of its circular cylindrical bore being of a material having good sliding characteristics and a higher heat-expansion coefficient than that of the other portions of the rotating part.

2. A construction according to claim 1, wherein said several bearing surfaces have the same radii, which are smaller than the radius of the cylindrical bore of said rotating part, said grooves being each arranged at the points of intersection of the radii of adjacent ones of said several bearing surfaces.

3. A construction according to claim 1, wherein said several bearing surfaces have the same radii, which are larger than the radius of the cylindrical bore of said rotating part, said grooves being each arranged between the points of intersection of the radii of adjacent ones of said several bearing surfaces.

4. A construction according to claim 1 in which said circular cylindrical bore of said rotating part has directly applied thereto a thin coating of said material.

5. A construction according to claim 1 in which said circular cylindrical bore of said rotating part is provided by a sleeve constructed of said material and fixed within said rotating part.

6. A construction according to claim 1 in which said circular cylindrical bore of said rotating part is lined with a metal sleeve, the bore of which is coated with said material.

7. A construction according to claim 1 wherein said material is a conventional bearing metal.

8. A construction according to claim 1 wherein said bearing metal is bronze.

9. A construction according to claim 1 in which said material is plastic.

10. A construction according to claim 1 wherein said plastic is polyamide.

11. A construction according to claim 1 including lubricant passageway means extending axially of said stationary pin and communicating with said grooves.

* * * * *

UNITED STATES PATENT AND TRADEMARK OFFICE
CERTIFICATE OF CORRECTION

PATENT NO. : 4,325,589

DATED : April 20, 1982

INVENTOR(S) : Manfred Hirt

It is certified that error appears in the above-identified patent and that said Letters Patent is hereby corrected as shown below:

On the title page, under "Related U.S. application data;

"Jun. 12, 1980" should read -- Oct. 29, 1979 --.

Signed and Sealed this

Third Day of August 1982

[SEAL]

Attest:

Attesting Officer

GERALD J. MOSSINGHOFF

Commissioner of Patents and Trademarks